United States Patent
Chappell et al.

(10) Patent No.: US 9,043,431 B2
(45) Date of Patent: May 26, 2015

(54) SYSTEMS AND METHODS TO PLAN EVENTS AT DIFFERENT LOCATIONS

(75) Inventors: Stephen Chappell, Los Angeles, CA (US); Jay H. Lieske, Jr., Los Angeles, CA (US); Samantha Nebrich, Los Angeles, CA (US)

(73) Assignee: YELLOWPAGES.COM LLC, Glendale, CA (US)

( * ) Notice: Subject to any disclaimer, the term of this patent is extended or adjusted under 35 U.S.C. 154(b) by 1034 days.

(21) Appl. No.: 12/135,098

(22) Filed: Jun. 6, 2008

(65) Prior Publication Data

US 2009/0307318 A1    Dec. 10, 2009

(51) Int. Cl.
*G06F 15/16* (2006.01)
*G06Q 10/10* (2012.01)

(52) U.S. Cl.
CPC ................... *G06Q 10/109* (2013.01)

(58) Field of Classification Search
CPC .................. G06F 17/30884; G06Q 10/109
USPC ....................................... 709/217
See application file for complete search history.

(56) References Cited

U.S. PATENT DOCUMENTS

| | | | |
|---|---|---|---|
| 6,690,672 B1 | 2/2004 | Klein | |
| 6,732,080 B1 * | 5/2004 | Blants | 705/7.18 |
| 7,289,812 B1 * | 10/2007 | Roberts et al. | 455/456.1 |
| 7,450,566 B2 | 11/2008 | Wong | |
| 2002/0131565 A1 * | 9/2002 | Scheuring et al. | 379/88.19 |
| 2002/0167919 A1 | 11/2002 | Marples et al. | |
| 2004/0234043 A1 | 11/2004 | Argo | |
| 2004/0234064 A1 | 11/2004 | Melideo | |
| 2004/0243939 A1 | 12/2004 | Perepa et al. | |
| 2004/0249951 A1 | 12/2004 | Grabelsky | |
| 2005/0018849 A1 | 1/2005 | Rodriguez et al. | |
| 2005/0256766 A1 | 11/2005 | Garcia et al. | |
| 2005/0289097 A1 | 12/2005 | Tossen et al. | |
| 2006/0078096 A1 | 4/2006 | Poyhonen et al. | |
| 2006/0206480 A1 * | 9/2006 | Heidloff et al. | 707/6 |
| 2007/0039024 A1 * | 2/2007 | Krajcev et al. | 725/46 |
| 2007/0112656 A1 | 5/2007 | Howe et al. | |
| 2007/0177578 A1 | 8/2007 | Anspach et al. | |
| 2007/0233736 A1 * | 10/2007 | Xiong et al. | 707/104.1 |
| 2008/0005268 A1 | 1/2008 | Chen | |
| 2008/0008306 A1 | 1/2008 | Kilger | |
| 2008/0071554 A1 | 3/2008 | Miles et al. | |

(Continued)

FOREIGN PATENT DOCUMENTS

WO         03102738        12/2003

OTHER PUBLICATIONS

What is Web 2.0? Ideas, Technologis and implications for eduction; JISC Technology & Standards Watch report, Feb. 2007; Paul Anderson.*

(Continued)

*Primary Examiner* — June Sison
(74) *Attorney, Agent, or Firm* — Kilpatrick Townsend & Stockton LLP

(57) ABSTRACT

Systems and methods are provided to specify a location of a planned event via a selection of a listing that has location information. For example, in response to a search request a listing may show a business entity at a geographic location; and the user may select the listing as a way to specify the location of a new event or an existing event. In some embodiments, one event can have multiple listings specifying multiple locations.

23 Claims, 8 Drawing Sheets

(56) References Cited

U.S. PATENT DOCUMENTS

| | | |
|---|---|---|
| 2008/0071833 A1 | 3/2008 | Madden |
| 2008/0092059 A1 | 4/2008 | White |
| 2008/0098079 A1 | 4/2008 | Sanghavi |
| 2008/0134041 A1* | 6/2008 | Zinn ............................ 715/733 |
| 2008/0141145 A1* | 6/2008 | Klausmeier .................. 715/751 |
| 2008/0201362 A1* | 8/2008 | Multer et al. ............. 707/103 R |
| 2008/0215678 A1* | 9/2008 | Coletrane et al. ............. 709/204 |
| 2009/0006442 A1* | 1/2009 | Anderson et al. ............. 707/102 |
| 2009/0012841 A1* | 1/2009 | Saft et al. ........................ 705/10 |
| 2009/0132665 A1* | 5/2009 | Thomsen et al. ............. 709/206 |
| 2009/0222488 A1* | 9/2009 | Boerries et al. ........... 707/104.1 |
| 2009/0307268 A1 | 12/2009 | Chappell |
| 2010/0191657 A1 | 7/2010 | Melideo |
| 2012/0203853 A1* | 8/2012 | Davis et al. .................... 709/206 |
| 2013/0166653 A1* | 6/2013 | Sherrets et al. ............... 709/204 |
| 2014/0195301 A1* | 7/2014 | Dear ............................ 705/7.31 |
| 2014/0228056 A1* | 8/2014 | Busch ........................ 455/456.3 |

OTHER PUBLICATIONS

ESI 2007 ACM SIGCHI Proceedings 2007 'Exploratory Searcch and HCI: Designing and Evaluating Interfaces to Support Exploratory Search Interaction'; White et. al.*

U.S. Appl. No. 61/068,086.*

U.S. Appl. No. 61/019,132.*

Evite, LLC, company and product information located at http://www.evite.com, available at least by May 9, 2008.

* cited by examiner

150

Business: Coffee [Keyword] Near: 93415 [Address] 📖 Search Hotlist

Star Coffee
★★★★☆ 151

101 Ocean View
San Francisco, CA 93415 (0.1 mi, Map)
1-415-281-1157 (Call or Email)

Based on 2 reviews
Rate it | Read reviews

Bean Café
★★★☆☆

102 Ocean View
San Francisco, CA 93415 (0.2 mi, Map)
1-415-281-3765 (Call or Email or Web Site)
Reservation Based on 17 reviews
Rate it | Read reviews

• • •

Express Café
★★★★★

102 Bay view
San Francisco, CA 93421 (1.1 mi, Map)
1-415-781-2513 (Call or Email)

Based on 12 reviews
Rate it | Read reviews

| Search | Distance | Hotlist | Featured |

Star Coffee

101 Ocean View
San Francisco, CA 93415          86 hotlisted  ⟩ 209

★★★★☆

Bean Café

102 Ocean View
San Francisco, CA 93415          75 hotlisted  >

★★★☆☆

200

| Star Coffee | ⭐ |
|---|---|
| Rating: ★★★★☆ | > |
| Location: 101 Ocean View<br>San Francisco, CA 93415 | |

Add to Favorites  ~221

Add to an Existing Plan  ~223

Add to a New Plan  ~225

Cancel  ~227

FIG. 6

Cancel ~231    233~ Done

| Title: | Night Out |
|---|---|
| Notes: | Let's have coffee together. |
| Location: | Star Coffee<br>101 Ocean View<br>San Francisco, CA 93415<br>Start: Thu Apr 10  8:00 PM<br>End:  9:00 PM | > |
| Add a Location: | > |
| Add a Friend: | ⋮ |

From:     Sam Nebrich [snebrich@xyz.com]
To:     John Bus [jbus@zyx.com]
Subject:     Sam shared a plan from Yellowpages.com

---

Sam shared a plan from Yellowpages.com with you.

Night Out

Thursday, April 10, 2008
From 8:00 PM to 10:00 PM

Let's have coffee together before we head to concert.

8:00 PM – 9:00 PM:     Star Coffee
    245 — 101 Ocean View
    San Francisco, CA 93415 (Map | Direction)
    (415) 552-4055
                241     243

9:00 PM – 10:00 PM:     Radiohead
    121 Ocean View
    San Francisco, CA 93415 (Map | Direction)

Price: $150-200
    Age Suitability: None Specified
    Performers: Radiohead

Who's Invited:

Jane Plain <jplain@tvb.com>
Jackie Brown <jbrown@dfk.com>

SYSTEMS AND METHODS TO PLAN EVENTS AT DIFFERENT LOCATIONS

FIELD OF THE TECHNOLOGY

At least some embodiments disclosed herein relate to searching and sharing information in general and, particularly but not limited to, scheduling events using data processing systems.

BACKGROUND

There are some applications that are designed to assist people in scheduling appointments, meetings and social events, such as birthday parties, etc.

For example, a calendar application running on a personal digital assistant (PDA) may allow a user to schedule an appointment on the calendar presented on the PDA device. The user may type in a description of the location of the appointment, a subject for the appointment, and a note for the appointment. The user may specify the starting time and the ending time of the appointment, and select an option to receive, from the PDA device, an alert about the appointment prior the appointment.

Some calendar applications allow the user to invite participants. For example, the user may select email addresses from a list as invitees of a meeting and type in a description about the location of the meeting and type in a separate message about the meeting. An email program integrated with the calendar application then sends email invitations to the invitees.

There are web based services that allow a user to compose a message and to invite participants to an event. A web-based user interface allows the user to type in a description of the location of the event, the email addresses of the invitee, and an invitation message. The web-based application then sends email invitations to the invitees based on the information received from the web-based user interface.

BRIEF DESCRIPTION OF THE DRAWINGS

The embodiments are illustrated by way of example and not limitation in the figures of the accompanying drawings in which like references indicate similar elements.

FIG. 3 illustrates a user interface to search and present listings of locations according to one embodiment.

FIG. 6 shows a user interface to add a listing into an event according to one embodiment.

FIG. 7 illustrates a user interface to edit an event according to one embodiment.

FIG. 8 illustrates an electronic message generated to share an event planned using a listing according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to specify a location of a planned event via a selection of a listing that has location information. For example, in response to a search request a listing may show a business entity at a geographic location; and the user may select the listing as a way to specify the location of a new event or an existing event. In some embodiments, one event can have multiple listings specifying multiple locations. The disclosure includes methods and apparatuses which perform these methods, including data processing systems which perform these methods, and computer readable media containing instructions which when executed on data processing systems cause the systems to perform these methods.

Figure 1:
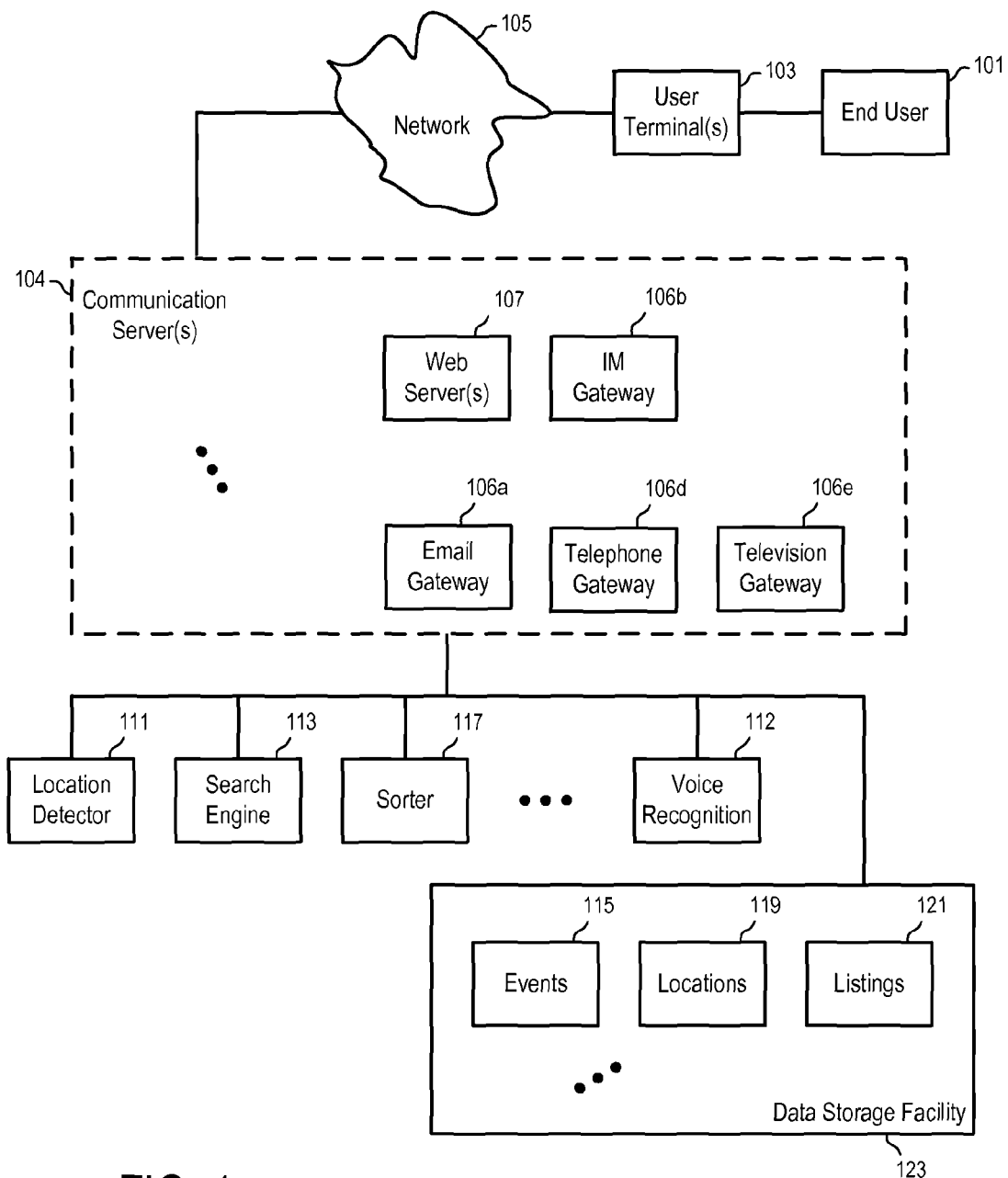
FIG. 1 shows a system to facilitate event planning according to one embodiment.

FIG. 1 shows a system to facilitate event planning according to one embodiment.

In FIG. 1, an end user (101) uses a user terminal (103) to submit a search request over the network (105) to a communication server (104) and/or to receive search results. The network (105) may include a local area network, a wireless data communication network, a telephone network, a cellular communication network, a telecommunication network, an interactive television network, an Internet Protocol Television (IPTV) network, an intranet, or a combination of networks, such as the Internet.

A communication server (104) may include a web server (107), an email gateway (106*a*), an instant messaging gateway (106*b*), a telephone gateway (106*d*), or a television gateway (106*e*), or other types of servers, such as an application gateway (not shown) to interface with different servers. Some embodiments may use one type of communication server (104), such as a web server (107), to receive the search request and another type of communication server (104), such as a television gateway (106*e*), to provide the search results. Some embodiments may use different types of communication servers (104) to service different types of user terminals (103).

In one embodiment, the web server (107) communicates with the user terminal (103) via HyperText Transfer Protocol (HTTP) and/or other types of communication protocols, such as File Transfer Protocol (FTP), Wireless Application Protocol (WAP), etc. The web server (107) may provide static web pages, dynamic web pages, and/or web services. In some embodiments, the web server (107) provides web applications to the user terminal (103) for execution in a web browser running on the user terminal (103); and the web applications may include scripts, such as Java, JavaScript, etc., for execution within an isolated environment in a browser. In some embodiments, the web server (107) may provide rich-client applications to the user terminal (103); and the rich-client application may be programmed in traditional programming languages, such as C/C++, to have full access to functions of the operating system running on the user terminal (103).

The communications server(s) (104) communicates with a location detector (111), a search engine (113), and/or a sorter (117) to process the search request and present search results based on the information stored in a data storage facility (123), such as listings (121) about business entities or public events, or other types of searchable events that are scheduled at predetermined dates and times, at corresponding geographic locations (119). In some embodiments, the location detector (111), the search engine (113), the sorter (117) and/or other modules, such as the voice recognition system (112), are servers communicating with the communication server (104) over a network, such as a local area network, an intranet, or Internet. These servers and the communication servers (104) may run on same or separate computers. In one embodiment, there may be one or more layers of application servers between the communication server (104) and the data storage facility (123) to process the business logic and data access of the rich client applications. Alternatively, application servers may be integrated with the communication servers (104), such as the web servers (107). Thus, the disclosure is not limited to a particular type of connections among the communication servers (104), the location detector (111), the search engine (113), the sorter (117), the data storage facility (123) and other modules, such as the voice recognition system (112).

In FIG. 1, the data storage facility (123) stores events (115) the end users (e.g., 101) planned. In some embodiments, the user terminal (103) stores the events (115).

In some embodiments, both the user terminal (103) and the online data storage facility (123) store the events (115) the end user (101) planned using the listings (121). When there is a data communication connection between the user terminal (103) and the online data storage facility (123), the user terminal (103) and the online data storage facility (123) synchronize their copies of the events (115) for the end user (101).

In one embodiment, the end user (101) can use the search engine (113) to select one listing (121) from the listings (121) stored on the data storage facility and use the selected listing (121) as an indicator of the location for a new event (115) or an existing event (115).

Listings (121) of businesses or people, such as restaurants, car dealers, retailer locations, service providers, gas stations, parking lots, plumbers, and the like, may have street addresses or other location parameters, such as longitude and latitude coordinates, stored as locations (119). The listings (121) may include addresses, telephone numbers, advertisements, announcements, and/or events, etc. For example, the listing (121) may be related to a public event that has a time associated with a location (119). The locations (119) may be part of the listings (121), or associated with the listings (121). In one embodiment, the listings (121) include information related to business entities at corresponding locations (119). The entities may be businesses or people. Some of the entities may be advertisers who pay advertisement fees to promote their listings (121). Some of the entities may be non-advertisers who have free listings (121).

In one embodiment, the listings (121) are accessible to the public or to registered members. The events (115) are associated with the corresponding end users (e.g., 101) who created the corresponding events (115). The web servers (107) generally limit the access to the events (115) to those who created the corresponding events (115). After the end user (101) specifies the identities of the friends or invitees with whom to share an event (115), the web servers (107) then allows the friends or invitees to access the shared event (115).

In one embodiment, the end user (101) may provide instructions to the user terminal (103) to notify the friends or invitees about the event (115) via email, short message service (SMS), voice mail, fax, or other communication channels, such as instant messaging, telephone, etc. The user terminal (103) or the web server (107) or a separate server not shown in FIG. 1, such as an application server, automatically generates the notification message based on the listing (121) by including a link to the listing (121) or a reference to the listing (121) in the notification message to show that the location of the event (115) is the corresponding location (119) of the listing (121). Thus, the friends or invitees not only have the location of the event (115), but also have the additional information of the listing (121) related to the event (115), such as the telephone number of the business entity, a web site of the business entity, a brief description of the business entity, user ratings and reviews of the business entity, etc.

In one embodiment, the communication servers (104) provide a user interface for user interaction with listings. For example, the web servers (107) may provide a user interface via static web pages, dynamic web pages, and/or web services, etc. For example, the web servers (107) may provide the listings (121) with links to detail information pages of the listings (121), such as a map, business hours, driving directions, etc. The web servers (107) may provide user interfaces for the users (e.g., 101) to rate the listings (121), provide reviews, view reviews from other users (e.g., 101), etc. The web servers (107) may provide user interfaces to make reservations or to make purchases via the listings (121). The web servers (107) may provide user interfaces to allow the end user (101) to plan events using the listings (121), to store or bookmark selected listings, to share the listings with friends, etc. The web servers (107) can track various different types of user interactions with the listings to determine or estimate the level of user interest in the listings. The web servers (107) may provide rich client applications for execution in the user terminal to provide the user interfaces.

In one embodiment, the location detector (111) determines a location of interest to the end user (101) related to the search request. The end user (101) may explicitly specify the location of interest in the search request; and the location detector (111) extracts the location of interest from the search request.

Alternatively, the end user (101) may implicitly specify the location of interest based on a preference stored and associated with identification information of the end user (101) or the user terminal (103).

In some embodiments, the location detector (111) automatically identifies the location of interest based on determining the current location of the user terminal (103) that is used to submit the search request. For example, the location detector (111) may determine the location of the user terminal (103) based on a connection point the user terminal (103) used to access the network (105) (e.g., based on the location of a wireless network access point, a base station of a cellular communication system, or a connection point to a wired network). In some embodiments, the user terminal (103) automatically determines its current position (e.g., via a satellite positioning system, or a cellular positioning system) and transmits the determined or estimated position to the web server (107) with the search request, or provides the position in response to a request from the location detector (111).

In one embodiment, the search engine (113) retrieves listings (121) from the data storage facility (123) according to a search request. The sorter (117) ranks the listings (121) in the search results according to the distance between the location of interest and the locations (119) of the listings (121), or according to current levels of user interest in the retrieved listings (121).

For example, the web servers (107) may track various different types of user interactions with the listings (121) to determine or estimate the level of user interest in the listings (121).

In some embodiments, the data storage facility (123) stores statistics of the tracked user interactions to determine an indicator of the level of user interest in a listing (121). The indicator of user interest may be in the form of hotlist points assigned to a listing (121). In one embodiment, the hotlist points (115) represent the popularity of a listing (121) among a set or subset of users, such as users of iPhone or iTouch from Apple, Inc. The data storage facility (123) may store the statistics as logs of web access to the listings (121) and/or other information related to the listings (121). The data storage facility (123) may store the statistics in the form of counts of various events.

For example, the web server (107) and the user terminal (103) may present the listing (121) in response to a search request from an end user (101). In response to the presentation of the listing (121) to the end user (101), the web server (107) adds a predetermined number of hotlist points to the previous hotlist points of the listing (121).

For example, the web server (107) and the user terminal (103) may present the listing (121) with a link to a web page for further detail information. In response to the end user (103) selecting the link to view the web page for further details, the web server (107) adds a predetermined number of hotlist points to the previous hotlist points of the listing (121). For example, the listing (121) may include a link to view a map showing a geographic area near the location of the business entity. For example, the listing (121) may include a link to view business hours, a detailed description, and/or a review, etc.

In one embodiment, the web server (107) and/or the user terminal (103) can identify the end user (101) who viewed the listing (121) and the date and time of the viewing activity to ensure that the listing (121) accumulates no more than a predetermined number of hotlist points from the viewing activity of the end user (101) within a period of time. In one example, a listing (121) can accumulate up to a predetermined number of hotlist points for all viewing activities by the same end user (101) within a predetermined time period (e.g., one day, a week, or a month). In another example, a listing (121) can accumulate a number of hotlist points weighted according to the number of previous views by the same end user (101) within a predetermined time period to phase out the contribution by excessive subsequent viewing activities.

In one embodiment, the web server (107) identifies the end user (101) based on a characteristic of the user terminal (103), such as a phone number, an Internet address, etc. In another embodiment, the web server (107) identifies the end user (101) based on a user name of the end user (101), after the web server (107) authenticates the end user (101).

In one embodiment, the user terminal (103) presents the listing (121) with a user interface element selectable to initiate the sharing of the listing (121) with a friend of the end user (101). For example, the user terminal (103) and/or the web server (107) may send the listing (121) or a link to the listing (121) to the friend of the end user (101) via email using the email gateway (106), via voice mail using the telephone gateway, via IM using IM gateway (106*b*), or via SMS or other communication channels using gateways not shown in FIG. 1. In response to the sharing of the listing (121) via the user terminal (103) and/or the web server (107), the web server (107) (or another module not shown in FIG. 1, such as an application server) adds a predetermined number of hotlist points to the previous hotlist points of the listing (121).

In one embodiment, after the end user (101) sharing (132) the listing (121) with another end user (101) via a message, such as an email message or an SMS message, the communication server (104) can monitor the user interaction with the message to add hotlist points to the listing (121). For example, the user may view the message, forward the message, or investigate the message (e.g., via a search related to the shared listing (121)). For example, the message may include a link to the listing (121), a link to a map, a detail page, or a website related to the listing (121), a link to perform a search of other listings near the listing (121), etc. The communication servers (104) may monitor the selection of the links provided in the message to add hotlist points to the listing (121).

In one embodiment, the user terminal (103) presents the listing (121) with a user interface element selectable for bookmarking. For example, the end user (101) may select the user interface element to add the listing (121) to a list of favorites for subsequent viewing. The web server (107) adds a predetermined number of hotlist points to the previous hotlist points of the listing (121) in response to the end user (101) adding the listing (121) to his/her list of favorites.

In one embodiment, the user terminal (103) presents the listing (121) with a user interface element usable for planning an event (115). For example, the end user (101) may select the user interface element to use the listing (121) to indicate a location for an event scheduled in a calendar or a plan. The end user (101) may store the event for subsequent reference, or share the plan with one or more friends. The web server (107) adds a predetermined number of hotlist points to the previous hotlist points of the listing (121) in response to the end user (101) selecting the user interface element to plan an event using the listing (121).

In one embodiment, the user terminal (103) presents the listing (121) with a user interface for rating the listing (121). For example, the end user (101) may use the user interface to rate the listing (121) from zero to five stars. The web server (107) adds a predetermined number of hotlist points to the previous hotlist points of the listing (121) in response to the end user (101) rating the listing (121) above a threshold (e.g., three stars). In one embodiment, the end user (101) may provide a review message for the listing (121); and the web server (107) adds a predetermined number of hotlist points to the previous hotlist points of the listing (121) in response to the review message.

In one embodiment, the user terminal (103) presents the listing (121) with a user interface element selectable to initiate a search in an area near the location of the listing (121). For example, the end user (101) may use the user interface element to request a search near the street address of the business or event of the listing (121). The search engine (113) then uses the listing (121) as an indicator of location of interest in the new search. The web server (107) adds a predetermined number of hotlist points to the previous hotlist points of the listing (121) in response to the end user (101) using the listing (121) to specify the location of interest for a search.

In one embodiment, the end user (101) may perform a search using the name of the business of the listing (121). Since the end user (101) is specifically looking for the listing (121), the web server (107) adds a predetermined number of hotlist points to the previous hotlist points of the listing (121) after the user terminal (103) presents the listing (121) to the end user (101) in response to such a name search.

In one embodiment, the user terminal (103) presents the listing (121) with a user interface element selectable to initiate a telephone call to an entity of the listing (121), such as the operator of the listing (121), the advertiser of the listing (121), the business owner of the listing (121), etc. The web server (107) adds a predetermined number of hotlist points to the previous hotlist points of the listing (121) in response to the end user (101) calling via the user interface element presented listing (121).

In one embodiment, to track the calls initiated via the listing (121), a separate telephone number is presented with the listing (121); and a telephone connection server receives the user phone call to the separate telephone number and forwards the phone call to the entity of the listing (121). In one embodiment, when the user interface element is selected, the telephone connection server calls back the end user (101) and calls the entity of the listing (121) separately to connect the end user and the entity of the listing (121).

In one embodiment, the user terminal (103) presents the listing (121) with a user interface to initiate a purchase or a reservation related to the listing (121). For example, the listing (121) may present a restaurant; and the end user (101) can use the user interface to make a reservation at the restaurant over Internet. For example, the listing (121) may present a movie theater; and the end user (101) can use the user interface to purchase one or more tickets for a movie show. The web server (107) adds a predetermined number of hotlist points to the previous hotlist points of the listing (121) in response to the end user (101) making a reservation or purchasing via the listing (121).

In one embodiment, the listings (121) may accumulate hotlist points via ways other than user interactions with the listings (121). For example, a listing (121) may obtain a number of points for having a status of an advertisement. An advertiser may pay a monthly fee to advertise the listing (121), or pay a fee in response to a user selecting a link of the listing (121) to view a web site of the advertiser, or pay a fee in response to a user calling the advertiser via the listing (121). The system, or the advertiser, may specify the advertisement fee.

In one embodiment, a listing (121) can obtain hotlist points for advertising but not based on the amount of the advertisement fee paid. For example, the advertiser may choose to pay more advertisement fees for increased number of presentations, for higher priorities, and/or for presentation of a banner or video advertisement with the listing (121). However, the listing (121) gets the same hotlist points for advertising as when the advertiser pays a less amount of advertisement fees.

Alternatively, a listing (121) can obtain hotlist points according to the amount of the advertisement fee paid. For example, a listing (121) can obtain a predetermined number of hotlist points in response to the advertiser paying more than a threshold level of advertising fees in a predetermined period of time. For example, a listing (121) can obtain a number of hotlist points that are proportional to the advertisement fees paid by the advertiser (or offered by the advertiser).

The web server (107) may add different numbers of hotlist points in response to different user interactions, such as viewing, sharing, bookmarking, planning, rating, searching, purchasing, calling, making a reservation, etc. The different numbers of hotlist points represent different weights in different user interactions towards the level of the user interest.

In one embodiment, the web server (107) combines the statistics about the user interactions and weights for different types of the user interactions to compute the level of the user interest.

For example, in one embodiment, hotlist points of a listing (121) is a function of statistics such as selection percentile, average user rating, and advertiser value.

In one embodiment, selection percentile is an n-tile partition of the number of selections of presented listings (121). For example, when the end user (101) clicks a link of a listing (121) to view a page showing additional information about the listing (121), the number of selections of the listing (121) increases by one. Thus, the number of selections of a listing (121) may be a potentially unbounded parameter. A listing in the group of the top 1% ranked according to the number of selections gets a selection percentile 100; and a listing at $33^{rd}$ percentile will get a value of 67. Thus, the selection percentile is a bounded parameter corresponding to the number of selections, which may be a parameter without a predetermined upper bound.

The use of the selection percentile in the determination of the hotlist points can limit the impact on the hotlist values of other listings (121) by frequently selected listings (121) that have very high numbers of selections. Further, the use of the selection percentile can mitigate the effects of "click abuse", where a business owner could "click" on his/her listings to improve its ranking.

In some embodiments, user selections of different links of a listing (121) to view different pages, such as a map, driving directions, details, etc., may have different weight in counting the number of selections for the determination of selection percentile. Further, each end user (101) may contribute only up to a predetermined number of selections to a listing (121) within a predetermined time period (e.g., one click per month), to prevent click abuse.

In one embodiment, end users (e.g., 101) can provide different ratings to a listing (121). For example, a user rating can be between zero to five; and thus, average user rating is a bounded value having predetermined bounds.

In one embodiment, advertiser value includes points and tier value for subscription listings. For example, when a listing pays a certain level of subscription, the listing has a predetermined tier value corresponding to the subscription level of the listing. Further, the listing may pay additional options, such as banner advertisements, video advertisements, etc. The options have corresponding predetermined points. Thus, advertiser value of a listing is a function of subscription level and the listing options. Since the available subscription levels and options are finite, advertiser value is also a bounded value having predetermined bounds.

In one embodiment, hotlist points of a listing are a weighted sum of selection percentile, average user rating, and advertiser value. For example, hotlist points can be computed based on the following expression.

$$w_a \times \text{Selection}_{Percentile} + w_b \times \text{Rating}_{Average} + w_c \times \text{Value}_{Advertiser}$$

where $\text{Selection}_{Percentile}$ represents selection percentile; $\text{Rating}_{Average}$ represents average user rating; and $\text{Value}_{Advertiser}$ represents advertiser value; and $w_a$, $w_b$, and $w_c$ are predetermined coefficients. For example, in one embodiment, selection percentile is in the range [0, 100], average user rating in [0, 5], and advertiser value in [0, 35000]; and $w_a=0.005$, $w_b=0.08$, and $w_c=1/350000$. Thus, selection percentile contributes up to 50% of "hotness", average user rating up to 40%, and advertiser value up to 10%; and hotlist points are in the range [0, 1]. Other combinations of weight coefficients can also be used to empirically determine the indicator of popularity among a group of end users (e.g., 101).

Other embodiments may use different types of expressions, such as Selection$_{Percentile}$×Rating$_{Average}$×Value$_{Advertiser}$. Thus, the disclosure is not limited to particular types of expressions.

In one embodiment, the data storage facility (123) associates the statistics with the date and/or time of the user interactions to determine the level of user interest based on recent user interactions to reflect the change of user interest over time. For example, the current interest may not include the statistics of user interactions that occurred before a threshold of a time period has passed. For example, the web server (107) (or another module not shown in FIG. 1, such as an application server) may weight the statistics of user interactions based on the elapsed time periods since the corresponding user interactions to determine the levels of user interest.

In one embodiment, the data storage facility (123) associates (not shown in FIG. 1) the statistics with the identities of the users (e.g., 101) who interacted with the listings (121). The web server (107) (or another module not shown in FIG. 1, such as an application server) may use the social relationship between a user (101) who is currently requesting the search result and the users (e.g., 101) who interacted with the listings in the past to customize the estimated level of user interest from the point of view of the requesting user (101).

For example, the web server (107) (or another module not shown in FIG. 1, such as an application server) may exclude or discount the user interactions performed by those who are not within a same group of the users as the end user (101) who is currently requesting the search result, in determining the level of user interest for the requesting user (101).

For example, in a social network, the user interactions of the friends of the requesting user (101) may have more weight than the user interactions of the friends of the friends of the requesting user. Thus, the web server (107) (or another module not shown in FIG. 1, such as an application server) can weight the user interactions according to the social distance between the requesting user (101) and the users who performed the user interactions to determine the level of user interest based on an identity of the end user (101).

For example, when the requesting user (101) uses the user terminal (103) of a particular type (e.g., a mobile telephonic apparatus, such as iPhone or iPod Touch from Apple, Inc.), the web server (107) (or another module not shown in FIG. 1, such as an application server) may exclude or discount the user interactions on other types of user terminals (103) in the determination of the levels of user interest for the requesting user (101). The determined (or estimated) level of user interest reflects the preference of users of the particular type of user terminals (103). The level of user interest is thus based on an identity of a group of users to which the end user (101) belongs.

In one embodiment, the user terminal (103) is a data processing system, such as a notebook computer, a personal computer, a workstation, a network computer, a personal digital assistant (PDA), a mobile phone, a cellular phone, a television set with or without a set top box, a game console, an electronic kiosk, microprocessor-based or programmable consumer electronics, and the like.

In one embodiment, the user terminal (103) includes a web browser which allows the end user (101) to submit a search request to one of the web servers (107) for location dependent information, such as a listing (121) of businesses or people, such as restaurants, car dealers, retailer locations, service providers, gas stations, parking lots, plumbers, and the like. Alternatively, the user terminal (103) may provide the search request via other communication channels, such as email, short message service (SMS), instant messaging (IM), telephone connection, etc. For example, the user terminal (103) may provide the search request to an email gateway (106a) via email, or to an IM gateway (106b) via instant messaging, or to a telephone gateway (106d) via a telephone call, or to a television gateway (106e) via an interactive television system. Some embodiments may use other types of gateways not shown in FIG. 1, such as gateways for SMS. Thus, the disclosure is not limited to the examples or combinations illustrated in FIG. 1.

In some embodiments, the end user (101) may use one user terminal (103) to submit the search request and another user terminal (103) to receive the search results. For example, the user (101) may submit the search request via an SMS message through one user terminal (103), and receive the search results at another user terminal (103) via email. For example, the user may submit the search request via voice through one user terminal (103) and receive the search results via a web page at another user terminal (103) or at the same user terminal (103). For example, in one embodiment, the user (101) may use a mobile phone as the user terminal (103) to transmit voice information, via a data connection through the network (105) and the web server (107) (or email gateway (106a), or IM gateway (106b), or other data communication gateways), or a telephone connection through a telephone gateway (106d)), to a voice recognition system (112) to formulate a search and receive a web page or email at the same user terminal (103) or at another user terminal (103) that shows the results of the search.

In one embodiment, one computer system implements the web servers (107), the location detector (111), the search engine (113), and the sorter (117). Alternatively, different processes running on one or more shared computers may implement some of the components (107, 111, 113, and 117). For example, one computing module, thread, or process may implement multiple of the components (107, 111, 113, and 117). In some embodiments, special purpose data processing systems implement the one or more of the components (107, 111, 113, and 117), such as using Application-Specific Integrated Circuit (ASIC) or Field-Programmable Gate Array (FPGA). In some embodiments, processes running according to software instructions on general purpose data processing systems, such as general purpose personal computers or server computers, can implement the components (107, 111, 113, and 117). Thus, the implementations are not limited to hardware, software, or particular combinations of hardware and software.

Different embodiments may implement the data storage facility (123) in different ways. For example, one or more data processing systems may store the information about the events (115), the locations (119) and the listings (121). For example, one or more relational or object oriented databases, or flat files on one or more computers or networked storage devices, may store the information about the events (115), the locations (119) and the listings (121). In some embodiments, a centralized system stores the information about the events (115), the locations (119) and the listings (121); alternatively, a distributed system, such as a peer to peer network, or Internet, may store the information about the events (115), the locations (119) and the listings (121).

Figure 2:
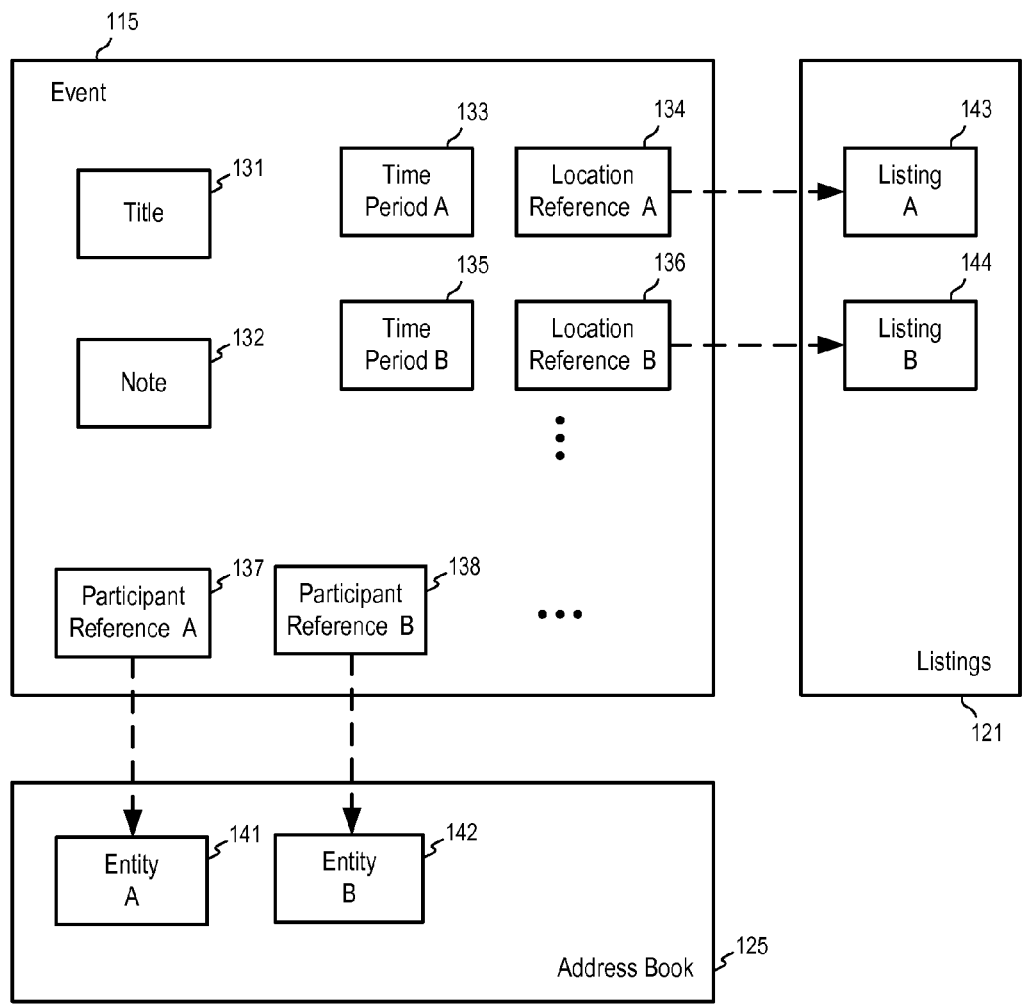
FIG. 2 illustrates a representation of an event according to one embodiment.

FIG. 2 illustrates a representation of an event according to one embodiment. In FIG. 2, an event (115) includes a title (131), a note (132), one or more location references (134 and 136), and the scheduled time periods (133 and 135) associated with the locations references (134 and 136). The event (115) may optionally include one or more participant references (e.g., 137 and 138).

In FIG. 2, the location references (134 and 136) are in a form of references to listings (143 and 144) of the listings (121) on the data storage facility (123) of the web servers (107). The listings (121) have corresponding locations (119); and thus the location references (134 and 136) implicitly specify the locations (119) via association with the listings (121). In some embodiments, a copy of the location (119) of the listings (143 and 144) is also stored within the event (115) as a backup copy, which is accessible when the listings (121) are not accessible. In one embodiment, the reference to a listing may include a reference to the web server.

Using the references (134 and 136) to the listings (143 and 144) to specify the locations (119) of the events (115) provides the user (101) with convenient access to the rich information offered by the listings (143 and 144), in addition to the location information. Thus, the references (134 and 136) to the listings (143 and 144) integrate the event planning and the information resource available from the web servers (107), enrich user experience and simplify the event planning process.

For example, the user terminal (103) or the web server (107) allows the user (101) to incrementally build up the content of an event (115) by simple selection of a listing (121) while searching or viewing businesses listings (121) or published event listings (121). The end user (101) can add the listing (121) into an event (115) with a selection of a user interface element. Thus, the end user (101) does not have to copy and paste information by going back and forth between different applications. The user terminal (103) or the web server (107) allows the user (101) to easily collect information related to locations (119) into a planned event (115).

In FIG. 2, the participant references (137 and 138) point to the entities (141 and 142) in an address book (125). In one embodiment, the user terminal (103) and/or the data storage facility (123) stores the address book (125). For example, in one embodiment, the address book (125) is accessible via the web servers (107).

In one embodiment, the end user (101) can insert the references (134 and 136) to the listings (143 and 144) into the event (13) by selecting from listings (121) presented on the user terminal (103). The user terminal (103) may present the listings (121) in response to a search request from the end user (101), or in response to the end user (101) browsing a category of listings (121). The end user (101) can also specify participants (137 or 138) by selecting from the address book (125). Alternatively, in some embodiments, the end user (101) may type a description to specify some locations without using references (134 and 136) to listings (121), or manually enter the contact information of some participants without using the address book (125).

In one embodiment, without specifying a keyword, the end user (101) may request a list of a subset of the listings (121) that have corresponding locations (119) near the current location of the user terminal (103) and that are ranked with top levels of user interest. The end user (101) then selects one from the subset of the listings (121) as a location of the event (115).

FIG. 3 illustrates a user interface to search and present listings of locations according to one embodiment. In FIG. 3, a user terminal (e.g., 103) provides a search user interface (150), which includes an input box (161) to receive one or more keywords, and an input box (163) to receive a location of interest. The end user (101) may alternatively use the icon button (165) to select the location of interest from a list of bookmarked locations.

In one embodiment, a bookmarked location can be a listing (121) the end user previously added to a list of favorites. The listing (121) has a location (119); and the bookmarked listing (121) represents the location (119) corresponding to the listing (121). An end user (101) can select the bookmarked listing (121) as a way to specify a location of interest. For example, the end user (101) can select the bookmarked listing (121) to search for other businesses near the location of the bookmarked listing (121).

In one embodiment, the end user (101) may select an entry of an address book to specify the location of interest in the input box (163). In one embodiment, the end user (101) may select a location from an interactive map.

In FIG. 3, after the end user (101) specifies the keyword in the input box (161) and the location of interest in the input box (163), the end user (101) can select the search button (167) to search for listings (121) of businesses that match the keyword and that are located near the location of interest. The end user (101) may select the icon button (169) to request listings (121) of "hot" businesses that match the keyword and that are located near the location of interest.

In one embodiment, "hot" businesses are those who have high levels of user interest. The sorter (117) may sort the search results according to the levels of current user interest for presentation on the user terminal (103) via the web servers (107).

In one embodiment, "hot" businesses are those who are popular among a group of end users (101), such as the end users (101) of a particular type of user terminals (103), such as the end users (101) of iPhone or iPod Touch from Apple, Inc., end users (101) of interactive television (e.g., via U-verse from AT&T), end users (101) of a type of web browser, etc.

After the search interface (150) receives the selection of the search button (167) (or the icon button (169) for popular listings (121)), the user terminal (103) submits the search request to web server(s) (107).

In one embodiment, the end user (101) may select the "hotlist" button (169) without specifying a keyword in the input box (161) and/or a location of interest in the input box (163). When the location of interest is not specified, the location detector (111) detects or estimates the current location of the user terminal (103) as the location of interest. When no keyword is specified in the input box (161), the search engine (113) performs the search based on the location of interest; and the search results are not limited to a particular category or keyword. The search engine (113) and/or the sorter (117) can select or order the listings (121) based on the level of user interest in listings (121) near the location of interest.

In one embodiment, the end user (101) implicitly specifies the location of interest based on the location of the user terminal (103), or based on a preference setting of the end user (101). In one embodiment, the location detector (111) determines the location of the user terminal (103) or the preference setting of the end user (101); and the input box (163) presents the location determined by the location detector (111) for verification and/or for modification.

For example, the user terminal (103) (e.g., with a global positioning system (GPS) unit) or the location detector (111) can automatically determine the current location of the user terminal (103) that presents the search user interface (150). The input box (163) displays the automatically determined location of the user terminal (103) as a default location; and the user may specify an alternative location via the input box (163) (or via the icon button (165)).

In FIG. 3, the user interface (150) presents the search results under the input boxes (162 and 163). In the example illustrated in FIG. 3, the user interface (150) presents listings (121) of business products and services in response to a search request.

In FIG. 3, the user interface (150) presents the listings (121) in an order according to the distance to location of interest. The measure of distance to the location of interest may be based on an estimated transportation time, a driving distance, a line-of-sight distance, according to user ratings, or according to the level of user interest, etc. In FIG. 3, if the end user (101) selects the icon button (169), the user interface (150) changes the order of the listings (121) to present the listings (121) according to the level of user interest.

In one embodiment, the listing (121) represents a business of products or services. The technologies disclosed herein can be used, for example, in a web site such as YELLOWPAGES.COM. The business entity of the listing (121) may pay a fee to become an advertiser or not pay a fee to have a free listing (121).

In FIG. 3, the user interface (150) presents a listing (121), such as the listing (121) for "Star Coffee", with various information about the business entity of the listing (121), including the street address, a telephone contact (153), a distance (155) to the location of interest, a user rating (151), a link (157) to initiate a telephone call to an entity of the listing (121), and other user interface elements (e.g., 159, 171-179) to interact with the listing (121).

For example, the end user (101) may select the link (159) to initiate a reservation process.

For example, the end user (101) may select the icon button (171) to search near the location (119) of the listing (121) for "Star Coffee", using the location (119) of the listing (121) for "Star Coffee" as a location of interest.

For example, the end user (101) may select the icon button (173) to share the listing (121) with a friend via email, SMS, IM, etc. In one embodiment, after the end user (101) selects the icon (173), a further user interface allows the end user (101) to specify an email address, a mobile phone number, or an instant messaging user identifier to send the listing (121), or a link to the listing (121), via email, SMS, or IM.

In one embodiment, the user terminal (103) or the communication server (104) or another module not shown in FIG. 1 generates the message to share the listing (121). The message includes a user interface element which is selectable by a viewer to add the listing (121) to an event (115) of the viewer of the message.

For example, the end user (101) may select the icon button (175) to add the listing (121) to a list of favorite listings of the end user (101).

For example, the end user (101) may select the icon button (177) to use the listing (121) as an indicator of a location for planning or scheduling an event. The user terminal (103) and/or the data storage facility (123) may store the event in a calendar and/or share the event (115) with one or more friends of the end user (101) via email, SMS, IM, voice mail, fax, etc. In one embodiment, after the end user (101) selects the icon button (177), the end user (101) can select an event (115) from a list of events (115) planned by the end user (101) to add the listing (121) to the selected event (115) or choose to add the listing (121) as a location in a new event (115).

For example, the end user (101) may select the icon button (179) to obtain driving directions to "Star Coffee" (e.g., starting from the location of interest specified in the entry box (163), or from the current location of the user terminal (103)).

In one embodiment, the advertiser pays a predetermined fee for priority in the display of the listings (121). For example, the advertiser may pay a monthly advertisement fee, or an advertisement fee charged for a predetermined number of presentations, to obtain a high priority in the ranking of the listings (121).

In another embodiment, the advertiser pays a predetermined fee when a link presented in the listing (121) forwards the end user (101) to a web location specified by the advertiser, such as a web site of the advertiser. In one embodiment, the advertiser pays a predetermined fee when the end user (101) calls the advertiser using the telephone contact provided in the listing (121).

In one embodiment, the operator of the search engine (113) specifies the predetermined advertisement fees. In another embodiment, the advertiser specifies and offers the predetermined advertisement fees; and the advertisers can adjust the offer of the advertisement fees to balance the need for a high ranking and the cost.

In FIG. 3, the listings (121) provide the "call" link to allow a customer to request a call back to the customer for a phone connection to the advertiser. When a telephonic device (e.g., a mobile phone or a computer having a phone implemented partially via software, etc.) presents the listing (121), the customer can use the "call" link to initiate a call from the telephonic device.

In FIG. 3, the listings (121) provide the "email" link to send the listing (121) and/or the phone number via email to an address specified by the user. In some embodiments, the user interface (150) also provides the end user (101) with an option to send the phone number via SMS, an option to save the listing (121) as a note, etc.

In FIG. 3, the listing (121) for "Bean Cafe" includes a "web site" link, which when selected by the end user (101) forwards the end user (101) to the web site of the business "Bean Cafe", or an information page hosted on the web server (107) to provide further details about the business, such as the business hours, payment options accepted by the business, a detailed description of the business, videos related to the business, etc.

In FIG. 3, the listings (121) also include links related to customer ratings of the business based on feedback from prior customers of the business. For example, the end user (101) may read reviews wrote by other users, or write about and/or rate the business.

In some embodiments, the listings (121) include banner or video advertisements (not shown in FIG. 3) from the corresponding entities of the listings (121). The listings (121) may include links to web locations specified by the advertisers.

In one embodiment, the heading "Star Coffee" includes a link to a web site of the business/advertiser of the listing (121). When the end user (101) selects the link, the link directs the end user (101) to the web site of the business/advertiser; and the advertiser may pay a per-selection advertisement fee, for the end user (101) that is directed by the link to the web site of the business/advertiser.

Alternatively or in combination, the end user (101) may call the telephone contact (153) provided in the listing (121); after a connection server connects the telephone call from the end user (101) to the business/advertiser, the advertiser may pay a per-call advertisement fee, responsive to the call that is directed by the telephone contact (153) to the business/advertiser.

In one embodiment, to track the calls forwarded to the business/advertiser, the listing (121) provides a telephone number of a connection server as the telephone contact (153) of the listing (121). When the connection server receives the call to the telephone number of the connection server, the connection server forwards the call to the telephone number of the business/advertiser, or makes a separate call to the telephone number of the business/advertiser and bridges the calls to make the connection.

Figure 4:
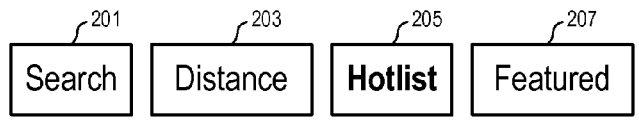
FIGS. 4-5 illustrate another user interface to search and present listings of businesses according to one embodiment.
Figure 5:

FIGS. 4-5 illustrate another user interface to search and present listings of businesses according to one embodiment. In one embodiment, a user terminal (103) implementing the user interface as illustrated in FIGS. 4-5 is a mobile computing device having radios for wireless access to the web servers (107), such as radios for cellular communications, wireless local area network communications, wireless personal area network communications, etc. The mobile computing device may be a cellular phone with an integrated Internet browser and a touch screen, with or without a keyboard. The mobile computing device may be a personal digital assistant with wired or wireless connections for network data communications. For example, the mobile computing device may be an iPhone or iPod Touch from Apple, Inc.

In FIG. 4, the user interface (200) includes a set of icon buttons (201-207). The end user (101) can select the search button (201) to request an interface (not shown) to specify a search criterion, such as a keyword, a location of interest, etc. The user interface (200) presents the search results under the set of icon buttons (201-207).

The end user (101) can select the icon button (203) to sort the search results according to the distance to the location of interest.

The end user (101) can select the hotlist button (205) to sort the search results according to the level of user interest represented by the hotlist points. In one embodiment, before the end user (101) specifies a search criterion using the search button (201), the end user (101) can directly select the hotlist button (205) to request a list of "hot" businesses near the current location of the user terminal (103) on which the user interface (200) is.

FIG. 4 illustrates a presentation of a set of listings (121) sorted by the sorter (117) according to hotlist points. The end user (101) can select a listing (121) from the set of listing (121) (e.g., by selecting the icon (209)) to view details of the listing (121).

In FIG. 4, the end user (101) can select the icon button (207) to request a list of featured listings (121). In one embodiment, the search engine (113) selects the featured listings (121) from a subset of the listings (121) that are advertised. In one embodiment, the search engine (113) uses a set of predetermined criteria to ensure the quality of the featured listings (121). For example, one criterion may require that a featured listing (121) have a user rating above a threshold. The sorter (117) may rank the featured listings (121) in an order according to the advertisement fees of the listings (121).

The user interface (210) in FIG. 5 shows a display of details of the listing (121) for "Star Coffee". It provides information about phone number, web site, email contact, business hours and/or other information such as the address, user rating, etc. In FIG. 5, the end user (101) can select the icon button (213) to search nearby the location of the listing (121), select the icon button (217) to send a message to another user (101) to share the information about the listing (121), or select the icon button (215) to add the listing (121) to a favorite list, an existing event, or a new event.

In one embodiment, the listing (121) shows an icon (211) to indicate that the listing (121) is already in the favorite list.

FIG. 6 shows a user interface to add a listing (121) into an event (115) according to one embodiment. After the icon button (215) in FIG. 5 is selected, the user interface shown in FIG. 6 includes a set of buttons (221-227) that provide the user (101) with the options to add the listing (121) to a favorite list, an existing event, or a new event, or cancel the operation.

For example, the end user (101) can select the "Add to Favorites" button (221) to add the listing (121) to favorites for future access. For example, the end user (101) can select the "Add to an Existing Plan" button (223) to add the listing (121) as a location indicator in an existing plan scheduled in a calendar. For example, the end user (101) can select the "Add to a New Plan" to generate a new plan of an event, using the location of the listing (121) as a location of the event.

FIG. 7 illustrates a user interface to edit an event according to one embodiment. In FIG. 7, the end user (101) can use the user interface to interact with an event planned using a selected listing (121) for "Star Coffee". In FIG. 7, the event (115) shows the location of the listing (121) for "Star Coffee" as the location of the event (115); and the end user (101) may add additional locations by selecting a listing (121) from a list of favorites, or selecting an entry from an address book, or typing in an address for the location. In one embodiment, the user can recall a previously saved search for a list of listings (121) and select a listing (121) from the list to specify a location of the event (115).

In FIG. 7, the end user (101) can also add a list of one or more friends to the planned event (115) by selecting the friends from an address book or by typing in contact information, such as email address, phone number, IM user identifiers, etc. When the end user (101) shares the plan, the user terminal (103) and/or the web server (107) can automatically generate a message for notifying the friends via email, SMS, IM, and/or voice mail, fax, etc.

FIG. 8 illustrates an electronic message generated to share an event planned using a listing (121) according to one embodiment. In FIG. 8, the user terminal (103) or the web server (107) automatically generates the message that includes the location of the planned event based on the selected listing (121) for "Star Coffee". The message includes a link (245) to the listing (121) for "Star Coffee", a link (241) to a map showing an area near "Star Coffee", and a link (243) to a direction to "Star Coffee".

In the example in FIG. 8, the message also includes a link to a published event "Radiohead". Since the end user (101) has selected the event listing (121) for "Radiohead" as the additional location of the event for "Night Out", the message shows the location of the event listing (121) for "Radiohead" as the location of the scheduled plan during the time period 9:00 PM-10:00 PM. The user terminal (103) or the web server (107) automatically inserts some of the key information fields, such as the price, age suitability, performers, etc., into the message based on the listing (121) for "Radiohead".

In the example illustrated in FIG. 8, the message also includes a list of the friends that have been invited by the end user (101) to the plan.

Figure 9:
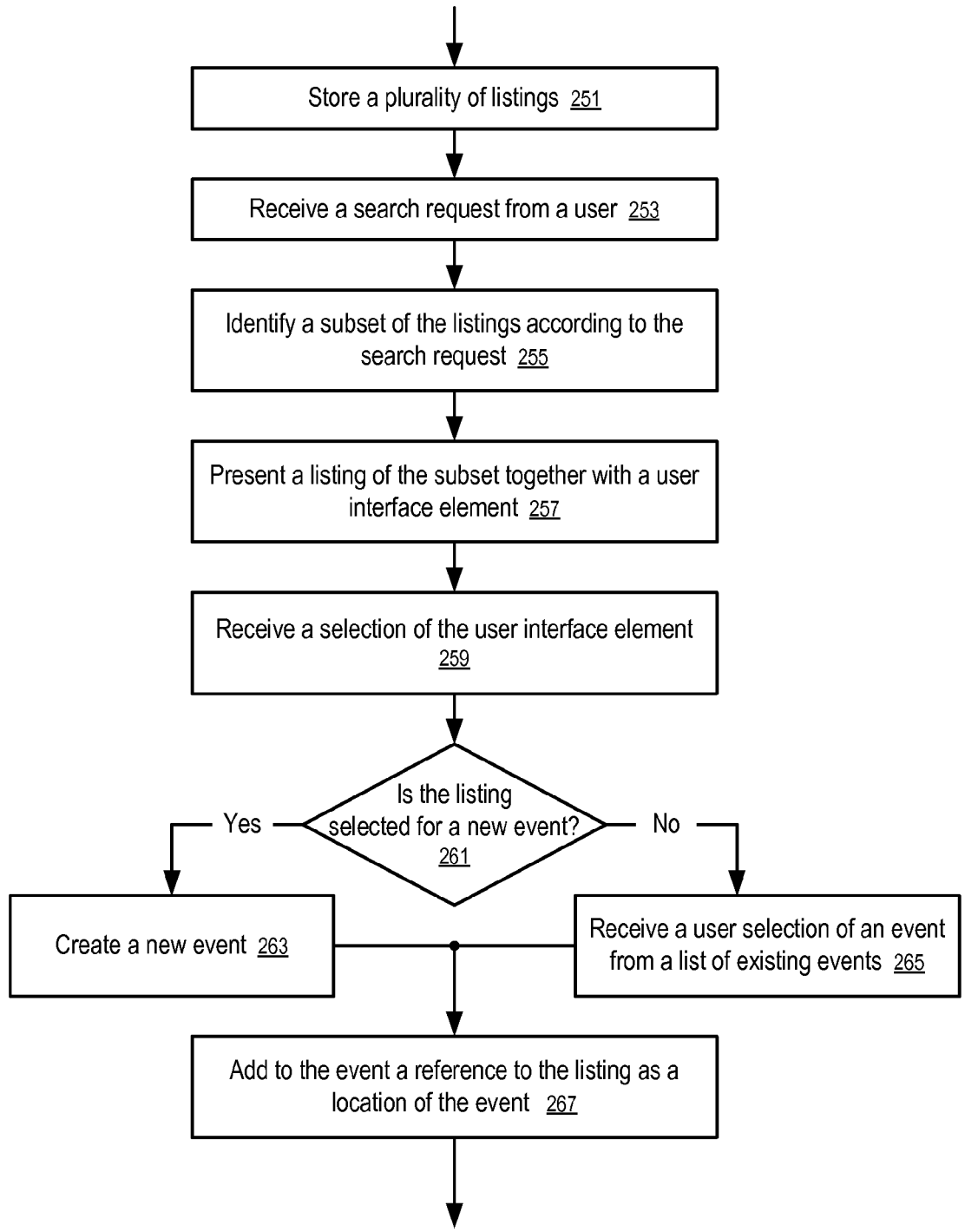
FIG. 9 shows a method to plan an event using a selected listing according to one embodiment.

FIG. 9 shows a method to plan an event (115) using a selected listing (121) according to one embodiment. In FIG. 9, a data storage facility (123) stores (251) a plurality of listings (121), which are accessible to an end user (101) via web servers (107). After a search engine (107) receives (253) a search request from a user (101) via the user terminal (103), the network (105) and the web severs (107), the search engine (107) identifies (255) a subset of the listings (121) according to the search request. The listings (121) may provide contact information of a business entity, such as a telephone directory listing (121) of the business entity.

After the user terminal (103) presents (257) a listing (121) of the subset together with a user interface element (e.g., 177, 215, 223 or 225), the user terminal (103) receives (259) a selection of the user interface element (e.g., 177, 215, 223 or 225) to add the listing (121) to an event (115) as an indicator of location for the event.

In one embodiment, the user interface element is associated with the listing (121), as the icon button (177) illustrated in FIG. 3; and when the user interface element is selected, the listing (121) is selected from the subset.

In one embodiment, the user interface element is not associated with a particular listing (121), as the icon button (215, 223 or 225) illustrated in FIG. 5 or 6. When the user interface element (215, 223 or 225) is selected, the user terminal (103) or the web server (107) uses the listing (121) that has been selected from the subset (e.g., selected via highlighting, or selected for display in a separate web page) as a location of the event (115).

In one embodiment, the web server (107) associates the user interface element with the listing (121). For example, the web server (107) may determine whether a listing (121) includes information specifying a geographic location, and provide the user interface element (e.g., 177) with the listing (121) in response to a determination that the listing (121) includes information specifying a geographic location (119). Alternatively, an application running on the user terminal (103) may determine whether to present the user interface element (e.g., 177) based on whether the listing (121) includes information specifying a geographic location (119).

If the operation (261) determines that the listing (121) is selected by the end user (101) for a new event, the user terminal (103) or the web server (107) creates (263) a new event (115) in response to the selection. If the operation (261) determines that the listing (121) is not selected for a new event, the user terminal (103) or the web server (107) presents a user interface to receive (265) a user selection of an event from a list of existing events (115). The user terminal (103) or the web server (107) then adds (267) to the event (115) a reference (e.g., 134 or 136) to the listing (121) as a location of the event.

In one embodiment, an event (115) is limited to have one location; and the selected listing (121) is used to replace the existing location in the event (115). In another embodiment, an event (115) can have more than one location; and the selected listing (121) is added to the existing event (115) in addition to one or more existing locations in the event (115).

In one embodiment, the user terminal (103) or the web server (107) generates a message (e.g., as illustrated in FIG. 8) using the listing (121) to provide information about the location of the event (115) represented by the reference (e.g., 134 or 136) to the listing (121). The user terminal (103) or the web server (107) then transmits the message to one or more communication contacts associated with the event. The message may be an electronic mail message, a short text message, a voice mail message, an instant message, or a fax message. In one embodiment, the message includes a link to the listing (121) hosted on a web server (107).

In one embodiment, the user terminal (103) is a mobile communication device which presents the user interface element (e.g., 177, 215, 223 or 225). The web server (107) remote to the mobile communication device, or another server not shown in FIG. 1, generates the message using the listings (121) stored on the data storage facility. During the scheduling of the event the end user (101) may provide a note (132) and a title (131) for inclusion in the message.

In one embodiment, the user terminal (103) provides a user interface that allows the end user (101) to select the one or more communication contacts from an address book (125). The user terminal (103) or the web server (107) associates the one or more communication contacts with the event (115) via the participant references (e.g., 137 or 138). When the end user (101) instructs the user terminal (103) to share the planned event (115), the user terminal (103) or the web server (107) automatically generates and sends messages to the one or more communication contacts.

In one embodiment, after receiving an invitation from an event planner, an invitee can access an event (115) stored on the data storage facility (123), make proposed changes to the event (115) and request the web severs (107) to notify the event planner and/or other invitees about the changes. Upon notification, the event planner may confirm/accept the changes, or reject the changes.

In one embodiment, the user terminal (103) or the web server (107) creates or modifies the event (115) in a calendar of the end user (101) hosted on the user terminal (103) or the web server (107), using the listing (121) selected by the end user (101). The end user (101) can associate a scheduled time period with the location represented by the reference (e.g., 134 or 136) to the listing (121). When there are multiple locations in an event (115), the end user (101) can specify a different time period for each of the locations planned in the event (115).

Figure 10:
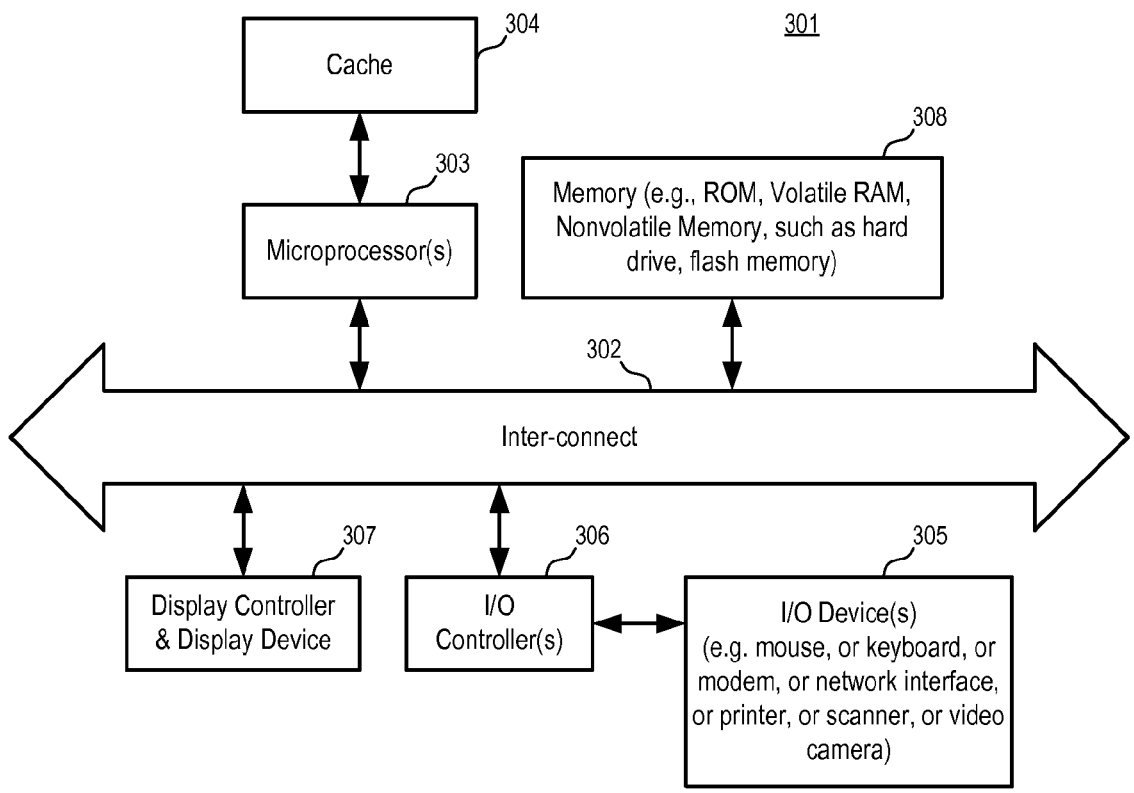
FIG. 10 illustrates a data processing system which can be used in various embodiments.

FIG. 10 illustrates a data processing system which can be used in various embodiments. While FIG. 10 illustrates various components of a computer system, it is not intended to represent any particular architecture or manner of interconnecting the components. Other systems that have fewer or more components may also be used.

In one embodiment, a server data processing system as illustrated in FIG. 10 is used as one of the web server(s) (107), a location detector (111), a search engine (113), a sorter (117), and/or a storage facility (123) for storing events (115), locations (119) and listings (121), etc. In some embodiments, one or more servers (e.g., 107, 111, 113, 117, 123) of the system can be replaced (e.g., by a system designer) with the service of a peer to peer network of a plurality of data processing systems, or a network of distributed computing systems. The peer to peer network, or a distributed computing system, can be collectively viewed (e.g., by the reader of the description) as a server data processing system.

In one embodiment, a user terminal (103) is a data processing system as illustrated in FIG. 10 to provide the user interfaces illustrated in FIGS. 3-7.

In FIG. 10, the data processing system (301) includes an inter-connect (302) (e.g., bus and system core logic), which interconnects a microprocessor(s) (303) and memory (308). The microprocessor (303) is coupled to cache memory (304) in the example of FIG. 10.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is a server system, some of the I/O devices, such as printer, scanner, mice, keyboards are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method comprising:
   transmitting, by a server system, a listing having location information for presentation via an end user device;
   responsive to a selection of a user interface element, adding, via the server system, to an event a reference to the listing to represent a first location of the event;
   associating a scheduled time period with the first location represented by the reference to the listing;
   maintaining, via the server system, statistics of user interactions with a set of listings for a subset of persons based on a common attribute of the persons;
   computing a respective point score for each listing of the set of listings based at least in part on the statistics of user interactions to determine a respective indication of a respective level of user interest in each listing of the set of listings;
   responsive to an end user search request, selecting a subset of the set of listings based at least in part on the subset of the set of listings corresponding to one or more locations near the first location and a ranking of respective point scores corresponding to at least the subset of the set of listings;

transmitting the subset of the set the listings in a list for presentation in an order based at least in part on the ranking;

responsive to a second selection of a user interface element, adding, via the server system, to the event a second reference to a second listing to represent a second location of the event, wherein the second listing is from the subset of the set the listings; and associating a second scheduled time period with the second location represented by the second reference to the second listing, the second scheduled time period being adjacent in time to the first scheduled time period.

2. The method of claim 1, further comprising:
receiving user input describing a further location of the event.

3. The method of claim 1, wherein the user interface element and the listing having location information are presented to a second user in a message from a first user associated with the end user device; wherein the message includes a reference to the listing.

4. The method of claim 1, wherein the user interface element and the listing having location information are presented in a list of bookmarked listings.

5. The method of claim 1, further comprising:
receiving the end user search request at a web server, wherein the listing having location information is presented on the end user device in response to the end user search request, the reference to the listing including a reference to the web server.

6. The method of claim 5, wherein the listing having location information provides contact information of a business entity.

7. The method of claim 6, wherein the listing having location information comprises a telephone directory listing of the business entity.

8. The method of claim 5, wherein the presenting of the user interface element and the listing having location information comprises presenting the list identified in response to the end user search request, the list including the listing having location information.

9. The method of claim 8, wherein the user interface element is associated with the listing having location information in the list.

10. The method of claim 9, further comprising:
determining whether the listing having location information includes information specifying a geographic location; and providing the user interface element with the listing having location information in response to a determination that the listing having location information includes information specifying a geographic location.

11. The method of claim 1, further comprising:
presenting a list of events, wherein the reference to the listing is added to the event in response to a selection of the event from the list of events.

12. The method of claim 11, wherein the event has the first location prior to the reference to the listing being added to the event.

13. The method of claim 12, wherein the reference to the listing is added to the event as a second location of the event in addition to the first location.

14. The method of claim 1, further comprising:
generating a message using the listing to provide information about the location of the event represented by the reference to the listing; and
transmitting the message to at least one communication contact associated with the event.

15. The method of claim 14, wherein the message comprises one of an electronic mail message, a short text message, a voice mail message, an instant message, or a fax message.

16. The method of claim 14, wherein the message comprises a link to the listing hosted on a web server.

17. The method of claim 14, wherein the user interface element is presented on a mobile communication device; and the message is generated on a server remote to the mobile communication device.

18. The method of claim 17, wherein the message further includes a note provided by a user in scheduling the event.

19. The method of claim 14, wherein the user interface element is presented on a mobile communication device; and the message is generated on the mobile communication device.

20. The method of claim 14, further comprising:
providing a user interface to select the at least one communication contact from an address book; and
associating the at least one communication contact with the event.

21. The method of claim 1, further comprising:
creating the event in a calendar in response to the selection.

22. A tangible non-transitory computer storage medium having stored thereon a set of instructions, which when executed on a computer cause the computer to perform a method comprising:
transmitting a listing having location information for presentation via an end user device;
responsive to a selection of a user interface element, adding to an event a reference to the listing to represent a location of the event;
associating a scheduled time period with the first location represented by the reference to the listing;
maintaining statistics of user interactions with a set of listings for a subset of persons based on a common attribute of the persons;
computing a respective point score for each listing of the set of listings based at least in part on the statistics of user interactions to determine a respective indication of a respective level of user interest in each listing of the set of listings;
responsive to an end user search request, selecting a subset of the set of listings based at least in part on the subset of the set of listings corresponding to one or more locations near the first location and a ranking of respective point scores corresponding to at least the subset of the set of listings;
transmitting the subset of the set the listings for presentation in an order based at least in part on the ranking;
responsive to a second selection of a user interface element, adding to the event a second reference to a second listing to represent a second location of the event, wherein the second listing is from the subset of the set the listings; and
associating a second scheduled time period with the second location represented by the second reference to the second listing, the second scheduled time period being adjacent in time to the first scheduled time period.

23. A data processing system, comprising:
one or more processors coupled to one or more network interfaces facilitating access to a network, and one or more non-transitory storage media to retain instructions, the one or more processors to execute the instructions to:

transmit a listing having location information for presentation via an end user device;

add to an event a reference to the listing to represent a location of the event, responsive to a selection of a user interface element;

associate a scheduled time period with the first location represented by the reference to the listing;

maintain statistics of user interactions with a set of listings for a subset of persons based on a common attribute of the persons;

compute a respective point score for each listing of the set of listings based at least in part on the statistics of user interactions to determine a respective indication of a respective level of user interest in each listing of the set of listings;

respond to an end user search request, select a subset of the set of listings based at least in part on the subset of the set of listings corresponding to one or more locations near the first location and a ranking of respective point scores corresponding to at least the subset of the set of listings;

transmitting the subset of the set the listings in a list for presentation in an order based at least in part on the ranking;

responsive to a second selection of a user interface element, add to the event a second reference to a second listing to represent a second location of the event, wherein the second listing is from the subset of the set the listings; and associate a second scheduled time period with the second location represented by the second reference to the second listing, the second scheduled time period being adjacent in time to the first scheduled time period.

* * * * *